Figure 1:
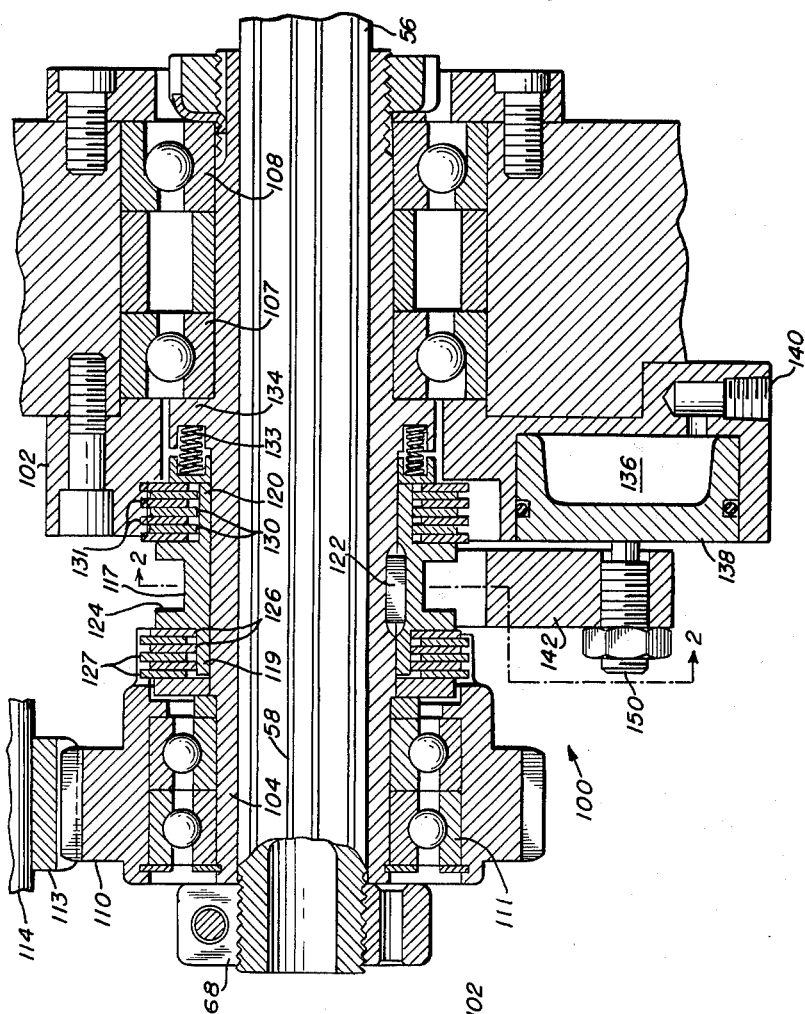
Figure 2:
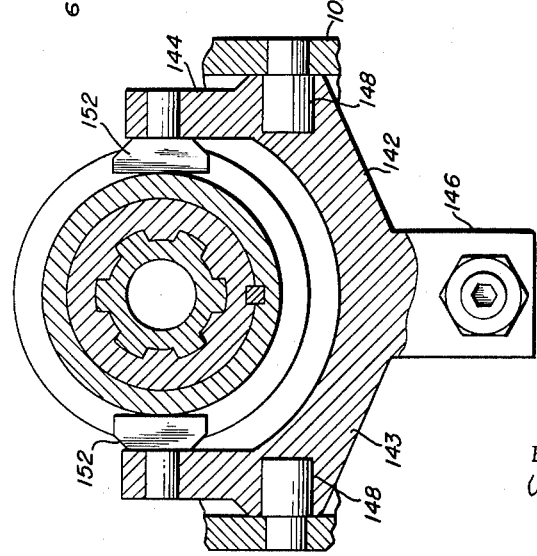

Aug. 24, 1965   K. P. SCHUBERT   3,202,249
CLUTCH AND BRAKE UNIT
Filed July 6, 1962

INVENTOR.
KARL P. SCHUBERT
BY
Woodling, Krost, Granger & Rust
attys.

United States Patent Office 3,202,249
Patented Aug. 24, 1965

3,202,249
CLUTCH AND BRAKE UNIT
Karl P. Schubert, Cleveland Heights, Ohio, assignor to The National Acme Company, a corporation of Ohio
Filed July 6, 1962, Ser. No. 207,959
4 Claims. (Cl. 192—18)

The invention relates in general to a drive unit and more particularly to a unit which can conveniently drive a shaft and when desired can brake the shaft to a stop.

In many industrial applications it is necessary to drive a shaft and at some point in time stop the shaft for another operation. This, for example, is true in the machine tool industry where a shaft through a chucking arrangement rotatively drives a workpiece while a tool (for example a cut off tool) performs a machining operation thereon. In the event it is necessary to perform aditional maching operations on the workpieces such as cross drilling, cross milling, or sloting operations, the workpiece must be restrained from rotation.

It is, therefore, an object of this invention to provide a unit which will reliably drive a rotatable shaft and when desired is capable of bringing the shaft to a fast and accurate stop.

Another object of the present invention is to provide a drive unit which comprises a gear normally connected to a shaft through engaged clutch plates carried by the gear and shifter member with the shifter member being rotatably connected to the shaft.

Another object of the present invention is to provide a drive unit which includes a shifter member which carries clutch and brake plates on opposed end portions and movement of the shifter member in one direction actuates clutch plates and in another direction actuates the brake plates.

Another object of the present invention is to provide a drive unit which includes a shifter member which is maintained in one position by spring means and in another position by lever means operated by fluid actuated piston means.

Another object of the present invention is to provide an actuating piston and cylinder arrangement for engaging brake plates surrounding a shaft with the axes of the piston and shaft being radially spaced from each other.

Another object of the present invention is to provide a drive unit which includes a lever arrangement for transmitting force to brake plates from a piston and cylinder which is offset from the brake plates and the shaft they surround.

Another object of the present invention is to provide a shaft with clutch means normally engaged by spring means and brake means actuated by a piston and cylinder means located completely on one side of the shaft axis with lever means between the brake means and the piston and cylinder means.

Another object of the present invention is to provide a means of transmitting an axial force to a member from a piston and cylinder means which is not coaxial with the member but rather is radially spaced therefrom.

Another object of the present invention is to provide a drive unit which is very compact and the movement between clutched and braked conditions is very small.

Another object of the present invention is to provide a drive unit which utilizes spring loading to engage the clutch which results in very fast action.

Other objects and a fuller understanding of this invention may be had by referring to the following description and claims, taken in conjunction with the accompanying drawings, in which:

FIGURE 1 is an enlarged side elevational view of the drive unit of the present invention; and RIGURE 2 is a sectional view taken on line 2—2 of FIGURE 1.

The drive unit of the present invention has been indicated generally by the reference numeral 100, FIGURE 1, which has a drive shaft 56.

This drive shaft may be used for many purposes and one such purpose is in a pick off attachment on a machine tool, such as is disclosed in my co-pending application Serial No. 207,958, filed July 6, 1962.

The drive unit 100 may be used for rotatably driving and stopping the shaft 56 and includes in combination what has been referred to as a mounting housing 102. An end portion 58 of the drive shaft 56 also includes an outer annular drive member 104 splined to the inner end portion 58. First and second bearings 107 and 108 respectively serve to rotatively mount the drive shaft and a first gear 110 is rotatively mounted by bearings 111 on the drive shaft for rotation with or relative to the drive shaft. A second gear 113 is intermeshed with and serves to drive the first gear 110 and the second gear 113 in turn is driven by a shaft 114 from a motive power source not shown.

An annular shifter member 117 is positioned around the drive shaft 56 adjacent the first gear 110 and is provided with first and second end portions 119 and 120 respectively. A key 122 serves to rotatively connect the annular shifter member to the drive shaft 56 and provides for slight axial movement of the shifter member relative to the drive shaft. The annular shifter member is also provided with wall means which define an annular groove 124 around the outside surface thereof.

A plurality of first clutch plates 126 are splined to the first end portion 119 of the shifter member 117 and a similar plurality of clutch plates 127 are splined to the first gear 110 and are intermeshed with the clutch plates 126. As a result, when the clutch plates 126 and 127 are engaged because of movement of the shifter member 117 to the left as seen in FIGURE 1, the drive shaft 56 is driven through the clutch plates from the first gear 110. A plurality of first brake plates 130 are splined to the second end portion 120 of the shifter member 117 and a similar plurality of second brake plates 131 are splined to the mounting housing 102. A plurality of circumferentially spaced springs 133 are located in recesses in a shoulder 134 on the outer annular drive member 104 and are in engagement with the right end of the annular shifter member 117 to normally urge the same axially to the left to normally engage the clutch plates 126 and 127, and by the same token to provide disengagement of the brake plates 130 and 131. This produces a normal condition whereby the drive shaft 56 is driven by means of the gears 110 and 113 through the engaged clutch plates.

Wall means are provided in the mounting housing 102 which serve to define an air cylinder 136 which has an axis generally parallel to the axis of the drive shaft 56 but as will be noted from FIGURE 1, is completely offset to one side of the drive shaft axis. A piston 138 is provided in the air cylinder 136 and is adapted for movement between first and second positions dependent upon the introduction of air under pressure into the cylinder through port 140.

A yoke member 142 is provided to transmit movement of the piston member within the cylinder to the annular shifter member to cause its movement to the right as seen in FIGURE 1 to engage the intermeshed brake plates 130 and 131. The yoke member has opposed arm portions 143 and 144 and an engagement end portion 146. Pivot pin members 148 serve to pivotally connect the arm portions 143 and 144 to the mounting housing 102 on opposed sides of the drive shaft, and the engagement end portion 146 of the yoke member is located adjacent the piston 138. An adjustment member 150 is carried by the engagement end portion 146 and engages the piston with the result that movement of the piston to the left causes pivoting of the yoke member about the pivot pin members 148. Shoes 152 are carried by each of the arm portions 143 and 144 and are located in the annular groove 124 in the outer surface of the shifter member.

The operation of the drive unit 100 is accomplished by the springs 133 which urge the clutch plates 126 and 127 into engagement. This provides a drive from the input gear 110 to the shaft 56. Braking is effected by admitting air under pressure into the cylinder 136. The movement of the piston 138 causes the yoke member 142 to shift the shifter member 117 to the right as seen in FIGURE 1 against the force of the springs 133, thereby engaging the brake plates 130 and 131 bringing the drive shaft 56 to a stop. This same axial movement causes disengagement of the clutch plates 126 and 127. When air pressure is released from the cylinder 136, the springs 133 release the brake, re-engage the clutch, and act through the yoke member 142 and adjustment member 150 to move the piston 138 back to the right, as viewed in FIGURE 1.

It will thus be seen that according to the teachings of the present invention a drive unit has been provided which will reliably drive a rotatable shaft and at the proper point in time is capable of bringing the shaft to a fast and accurate stop. The present construction provides a mechanism for alternately moving a drive unit between clutched and braked conditions by means of a shifter member which is rotatively connected to the drive shaft. The drive unit is maintained in its closed condition in a reliable manner by the action of the springs 133 whereas the yoke member or lever means 142 actuated by the piston and cylinder arrangement serves to brake the unit to a stop when so desired. The connection between the piston and cylinder arrangement and the annular shifter member 117 also serves as a convenient means for providing an axial force to the shifter member from the piston and cylinder which is offset from the axis of the drive shaft. The construction of the hereindisclosed drive unit is very compact and the movement between closed and braked conditions is very small.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A drive unit including in combination a housing,
   a shaft in said housing,
   means rotatively mounting said shaft,
   a shifter member rotatively connected to said shaft and capable of axial shifting movement relative thereto,
   an annular groove on said shifter member,
   a gear member,
   clutch plate means between said gear member and said shifter member,
   spring means urging said shifter member in a first axial direction to normally engage said clutch plate means,
   brake plate means between said housing and said shifter member,
   wall means defining a cylinder in said housing having an axis parallel to and displaced from said shaft,
   a piston in said cylinder,
   connection means between said piston and said shifter member comprising lever means having first and second end portions,
   said first end portion having a yoke with opposed arms disposed in said annular groove in said shifter member,
   said second end portion engageable with said piston,
   means pivotally connecting said lever means to said housing between said first and second end portions,
   and movement of said piston causing pivoting of said lever means and axial movement of shifter member in a second axial direction to overcome said spring means and engage said brake plate means.

2. A drive unit including in combination a housing,
   a shaft in said housing,
   a gear,
   an annular shifter member positioned on said shaft adjacent said gear and having first and second end portions,
   said annular shifter member being connected to said shaft for rotation therewith and for relative axial movement thereto,
   and having wall means defining an annular groove thereon,
   a plurality of first clutch plates connected to said first end portion of said shifter member,
   a plurality of second clutch plates connected to said gear and intermeshed with said first clutch plates,
   a plurality of first brake plates connected to said second end portion of said shifter member,
   a plurality of second brake plates connected to said housing,
   a plurality of spring members carried by said shaft and engaging said annular shifter member to constantly urge same axially to engage said first and second clutch plates,
   wall means in said housing defining a cylinder having an axis generally parallel to said shaft axis and completely offset to one side of said shaft axis,
   a piston in said cylinder for movement between first and second positions therein,
   port means for introducing fluid into said cylinder,
   a lever member having opposed arm portions and an engagement end portion,
   pivot members between said arm and engagement end portions pivotally mounting said lever member to said housing with said arm portions located on opposed sides of said shift member and said engagement end portion located adjacent said piston,
   shoes carried by each of said opposed arm portions and each residing in said annular groove in said annular shifter member,
   introduction of fluid into said cylinder causing movement of said piston which causes said lever member to pivot with said shoes axially shifting said annular shifter member and overcoming the force of said spring members to engage said first and second brake plates,
   whereby said shaft is braked through said annular shifter member, said engaged brake plates and said housing.

3. A drive unit including in combination a housing journalling a shaft,
   a gear journalled relative to said shaft,
   an annular shifter member positioned around said shaft adjacent said gear and having first and second end portions,
   said annular shifter member being connected to said shaft for rotation therewith and for relative axial movement thereto and having wall means defining an annular groove around the outside surface thereof,
   a plurality of first clutch plates splined to said first end portion of said shifter member,
   a plurailty of second clutch plates splined to said gear and intermeshed with said first clutch plates,
   a plurality of first brake plates splined to said second end portion of said shifter member, a plurality of second brake plates splined to said housing, a plurality of spring members carried by said shaft and engaging said annular shifter member to constantly urge same axially to engage said first and second clutch plates whereby said shaft is clutched to said gear, wall means in said housing defining a single cylinder having an axis generally parallel to said shaft axis and completely offset to one side of said shaft axis, a piston in said cylinder for movement between first and second positions therein, port means for introducing fluid into said cylinder, a yoke member having opposed arm portions and an engagement end portion, pin members between said arm and engagement end portions pivotally mounting said yoke member to said housing with said arm portions located on opposed sides of said shifter member and said engagement end portion located adjacent said piston, and shoes carried by each of said opposed arm portions and each residing in said annular groove in said annular shifter member.

4. A drive unit including in combination a mounting housing, a shaft journalled in said housing, a gear journalled relative to said shaft, an annular shifter member positioned around said shaft adjacent said gear and having first and second end portions, said annular shifter member being keyed to said shaft for slight axial movement in both directions and having wall means defining an annular groove around the outside surface thereof, a plurality of first clutch plates splined to said first end portion of said shifter member, a plurality of second clutch plates splined to said gear and intermeshed with said first clutch plates, a plurality of first brake plates splined to said second end portion of said shifter member, a plurality of second brake plates splined to said housing, a plurailty of spring members carried in recesses in said shaft and engaging said annular shifter member to constantly urge same axially to engage said first and second clutch plates whereby said shaft is clutched to said gear, wall means in said housing defining a single cylinder having an axis generally parallel to said shaft axis and completely offset to one side of said shaft axis, a piston in said cylinder for movement between first and second positions therein, a yoke member having opposed arm portions and an engagement end portion, means pivotally mounting said yoke member to said housing with said arm portions located on opposed sides of said shifter member and said engagement end portion located adjacent said piston, shoes carried by each of said opposed arm portions and each residing in said annular groove in said annular shifter member, and introduction of fluid into said cylinder causing movement of said piston which engages said engagement end portion of said yoke with said shoes axially shifting said annular shifter member overcoming the force of said spring members and to engage said first and second brake plates whereby said shaft is braked through said annular shifter member, said engaged brake plates and said housing.

References Cited by the Examiner

UNITED STATES PATENTS

| 1,572,870 | 2/26 | Armstrong | 192—99 |
| 1,624,174 | 4/27 | Lucarelle et al. | |
| 2,252,906 | 8/41 | Williamson. | |
| 2,338,546 | 1/44 | Scholl | 192—85 |
| 2,441,543 | 5/48 | Longfield. | |
| 2,577,641 | 12/51 | Wissman | 192—4 |
| 2,791,130 | 5/57 | Boughner. | |
| 2,870,655 | 1/59 | Rockwell. | |
| 2,918,832 | 12/59 | Meyers | 192—18 |
| 2,998,872 | 9/61 | Sommer et al. | |
| 3,103,838 | 9/63 | Beacom et al. | |

FOREIGN PATENTS 872,159  5/53  Germany.

DAVID J. WILLIAMOWSKY, *Primary Examiner.*

ROBERT C. RIORDON, *Examiner.*